Patented Mar. 17, 1936

2,033,910

UNITED STATES PATENT OFFICE 2,033,910

PROCESS OF PURIFYING DIALKYL SULPHATES

Henry Leon Cox and Thomas F. Carruthers, South Charleston, W. Va., assignors to Carbide and Carbon Chemicals Corporation, South Charleston, W. Va.

No Drawing. Application March 14, 1933, Serial No. 660,643

11 Claims. (Cl. 260—99.12)

The invention is an improved process for making dialkyl sulphates. A primary object of the invention is to facilitate the preparation of dialkyl sulphates in very pure form, particularly those, such as diethyl sulphate, which ordinarily are exceedingly difficult to obtain exceptionally pure.

Dialkyl sulphate fractions can be separated from the products of the absorption of olefines in sulphuric acid, and various processes are known for obtaining these dialkyl sulphate fractions and making them more or less pure. The improved process invented by us broadly comprises distilling such dialkyl sulphate fractions in the presence of small quantities of sulphuric acid.

The invention is applicable to dialkyl sulphates generally, and particularly to those derived from the lower olefines and which are insoluble in water. Thus, for example, our new process may be applied to the preparation of dibutyl sulphates, diisopropyl sulphate, and diethyl sulphate. It is of especial benefit in making diethyl sulphate, and while not restricted thereto, the process will be described with respect to diethyl sulphate for purposes of illustration.

Ethylene can be absorbed in sulphuric acid to form a liquor containing ethyl sulphuric acid and diethyl sulphate. The diethyl sulphate can be separated and recovered from this liquor by diluting it with water and drawing off a liquid layer which separates out and which contains the diethyl sulphate. This separated crude diethyl sulphate can be distilled to purify it in the usual manner by which organic liquids are purified, and a water-white product is obtainable upon distillation. This apparently pure diethyl sulphate upon standing discloses the presence of impurities which are not readily removable by distillation. The impurities are evidenced by the development of intense coloration. This color developed in the product may range from yellow to deep purple, and is exceedingly objectionable.

Our improved process makes possible the production of a water-white product of high purity which will not discolor even upon long storage. The process is practiced by adding a small quantity of sulphuric acid to the diethyl sulphate prior to the final distillation. We prefer to use about 1% of sulphuric acid having a specific gravity of 1.84. Less than 1% of the acid may be used, but in such cases a correspondingly longer time of contact between the acid and the material to be treated must be allowed. Amounts of sulphuric acid greater than 1% are also permissible, but relatively large quantities, such as 10%, act chemically upon the product and appreciably reduce the yield of refined dialkyl sulphate. In general, less than 10% should be used, and, as stated, 1% represents a preferred quantity and this amount does not cause any appreciable decrease in the yield of dialkyl sulphate obtainable.

For example, a liter of diethyl sulphate was prepared and distilled to give a substantially water-white product. Upon standing this product developed a deep purple color. A quantity of concentrated sulphuric acid equal to 1% of the diethyl sulphate was added thereto, and it was again distilled. About 99% of the initial quantity of material was obtained as pure water-white diethyl sulphate. This material made in accordance with our invention developed no color even after standing for a much longer period of time than the sample which became highly discolored.

We claim:

1. Process for purifying crude dialkyl sulphates obtained by the absorption of olefines in sulphuric acid which includes the step of effecting the final distillation of the dialkyl sulphates in the presence of small quantities of sulphuric acid.

2. Process for purifying crude dialkyl sulphates obtained by the absorption of olefines in sulphuric acid which includes the step of effecting the final distillation of the dialkyl sulphates in the presence of less than 10% of sulphuric acid.

3. Process for purifying crude dialkyl sulphates obtained by the absorption of olefines in sulphuric acid which includes the step of effecting the final distillation of the dialkyl sulphates in the presence of about 1% of concentrated sulphuric acid.

4. Process for purifying crude diethyl sulphate obtained by the absorption of ethylene in sulphuric acid which includes the step of effecting the final distillation of the diethyl sulphate in the presence of small quantities of sulphuric acid.

5. Process for purifying crude diethyl sulphate obtained by the absorption of ethylene in sulphuric acid which includes the steps of a preliminary distillation of the diethyl sulphate to yield a substantially pure product, and a final distillation of the diethyl sulphate in the presence of less than 10% of sulphuric acid whereby the pure product is obtained.

6. Process for obtaining pure dialkyl sulphates which includes the steps of separating a dialkyl sulphate fraction from the products of the absorption of olefines in sulphuric acid and effecting the final distillation of the separated dialkyl sulphate fraction in the presence of a small quantity of sulphuric acid.

7. Process for obtaining pure dialkyl sulphates which includes the steps of separating a dialkyl sulphate fraction from the products of the absorption of olefines in sulphuric acid and effecting the final distillation of the separated dialkyl sulphate fraction in the presence of less than 10% of sulphuric acid.

8. Process for obtaining pure dialkyl sulphates which includes the steps of separating a dialkyl sulphate fraction from the products of the absorption of olefines in sulphuric acid and effecting the final distillation of the separated dialkyl sulphate fraction in the presence of about 1% of concentrated sulphuric acid.

9. Process for obtaining pure diethyl sulphates which includes the steps of separating a diethyl sulphate fraction from the products of the absorption of ethylene in sulphuric acid and effecting the final distillation of the separated diethyl sulphate fraction in the presence of small quantities of sulphuric acid.

10. Process for obtaining pure diethyl sulphates which includes the steps of separating a diethyl sulphate fraction from the products of the absorption of ethylene in sulphuric acid and effecting the final distillation of the separated diethyl sulphate fraction in the presence of less than 10% of sulphuric acid.

11. Process for obtaining pure diethyl sulphates which includes the steps of separating a diethyl sulphate fraction from the products of the absorption of ethylene in sulphuric acid and effecting the final distillation of the separated diethyl sulphate fraction in the presence of about 1% of concentrated sulphuric acid.

HENRY L. COX.
THOMAS F. CARRUTHERS.